(12) United States Patent
Mayer et al.

(10) Patent No.: US 11,143,317 B2
(45) Date of Patent: Oct. 12, 2021

(54) SHUT-OFF MEMBER FOR A FLUID VALVE, AND METHOD FOR PRODUCING A SHUT-OFF MEMBER

(71) Applicant: GEMU Gebr. Mueller Apparatebau GmbH & Co. Kommanditgesellschaft, Ingelfingen (DE)

(72) Inventors: Juergen Mayer, Schwaebisch Hall (DE); Klaus Frankenbach, Forchtenberg-Schleierhof (DE)

(73) Assignee: GEMUE Gebr. Mueller Apparatebau GmbH & Co. Kommanditgesellschaft, Ingelfingen (DE)

( * ) Notice: Subject to any disclaimer, the term of this patent is extended or adjusted under 35 U.S.C. 154(b) by 111 days.

(21) Appl. No.: 16/047,277

(22) Filed: Jul. 27, 2018

(65) Prior Publication Data

US 2019/0040964 A1 Feb. 7, 2019

(30) Foreign Application Priority Data

Aug. 7, 2017 (DE) ........................ 102017117910.0

(51) Int. Cl.
*F16K 7/14* (2006.01)
*F16K 37/00* (2006.01)
*B23P 15/00* (2006.01)

(52) U.S. Cl.
CPC .............. *F16K 7/14* (2013.01); *B23P 15/001* (2013.01); *F16K 37/0041* (2013.01); *F16K 37/0075* (2013.01)

(58) Field of Classification Search
CPC .... F16K 7/14; F16K 37/0041; F16K 37/0075; B23P 15/001
See application file for complete search history.

(56) References Cited

U.S. PATENT DOCUMENTS

| 6,722,629 | B1 * | 4/2004 | Nakazawa | ................ F16K 7/14 251/129.17 |
| 7,363,824 | B2 | 4/2008 | Buck et al. | |
| 2004/0052202 | A1 * | 3/2004 | Brollier | ................ G06K 19/045 369/273 |
| 2005/0092079 | A1 * | 5/2005 | Ales | ........................ F16K 7/14 73/270 |
| 2007/0181842 | A1 * | 8/2007 | Igarashi | ................ F16K 41/103 251/366 |

(Continued)

FOREIGN PATENT DOCUMENTS

| CN | 101636608 A | 1/2010 |
| CN | 205422565 U | * 8/2016 |

(Continued)

OTHER PUBLICATIONS

Office Communication from the German Patent Office dated Jul. 27, 2018.

*Primary Examiner* — Angelisa L. Hicks
(74) *Attorney, Agent, or Firm* — Bond Schoeneck & King, PLLC; George McGuire

(57) ABSTRACT

A shut-off member for a fluid valve is proposed. The shut-off member includes a blind hole that is made in the shut-off member, the blind hole leading from a dorsal side into a ventral portion; an electronic data carrier which is arranged in a base region of the blind hole; and a casting compound that is introduced into the blind hole and that fixes the electronic data carrier to the shut-off member.

9 Claims, 3 Drawing Sheets

(56) References Cited

U.S. PATENT DOCUMENTS

| | | | |
|---|---|---|---|
| 2008/0129514 A1* | 6/2008 | Chisholm | B29C 45/14065 |
| | | | 340/572.8 |
| 2008/0202606 A1 | 8/2008 | O'Hara et al. | |
| 2012/0147923 A1* | 6/2012 | Schmidt | G01K 1/16 |
| | | | 374/158 |

FOREIGN PATENT DOCUMENTS

| | | |
|---|---|---|
| DE | 102012001652 A1 | 8/2013 |
| DE | 102013214304 A1 | 1/2015 |
| DE | 102013215294 A1 | 2/2015 |
| DE | 102015210210 A1 | 8/2016 |
| DE | 102015210208 A1 | 12/2016 |
| DE | 102016106818 B3 | 3/2017 |
| EP | 3070381 A1 | 9/2016 |
| WO | 9910673 A1 | 3/1999 |
| WO | 2015010810 A1 | 1/2015 |

* cited by examiner

SHUT-OFF MEMBER FOR A FLUID VALVE, AND METHOD FOR PRODUCING A SHUT-OFF MEMBER

CROSS-REFERENCE TO RELATED APPLICATIONS

This application relates and claims priority to German Application No. DE 10 2017 117 910.0, filed Aug. 7, 2017, the entire disclosure of which is incorporated herein by reference.

BACKGROUND OF THE INVENTION

The invention relates to a shut-off member for a fluid valve, and to a method for producing a shut-off member.

Shut-off members for fluid valves may be in a plurality of shapes and are adapted to the particular intended use or valve type. In particular, what are referred to as plug shut-off members or plug diaphragms are known. By way of example, reference is made to DE 10 2013 215 294 A1.

Furthermore, electronic data carriers, in particular RFID transponders, are known, the identifier of which can be read out in a contactless manner using a reader. WO 2015/010810 A1 for example discloses a membrane in which an electronic data carrier is arranged in a tab protruding from the membrane.

SUMMARY OF THE INVENTION

The object of the invention can therefore be considered that of fixing an electronic data carrier to a shut-off member.

The object of the invention is achieved by a shut-off member according to claim 1 and by a method for producing a shut-off member according to an independent claim.

According to a first aspect, a shut-off member for a fluid valve is proposed. The shut-off member comprises: a blind hole that is made in the shut-off member, the blind hole leading from a dorsal side into a ventral portion, to the surface of which a process fluid is applied during operation of the fluid valve; an electronic data carrier which is arranged in a base region of the blind hole; and a casting compound that is introduced into the blind hole and that fixes the electronic data carrier to the shut-off member.

The electronic data carrier is advantageously introduced from a rear side, i.e. the dorsal side of the shut-off member, as a result of which contact with the process fluid can be precluded during normal operation. In order to read out the electronic data carrier, a reader is brought towards the distal end of the ventral portion, and an identifier stored on the electronic data carrier is read out by the reader.

A further advantage of the proposed shut-off member is that the electronic data carrier is at a location that is different from a fastening region of the shut-off member. This isolation is advantageous in particular in the case of a rotationally symmetrical shut-off member that can be arranged in the fluid valve in any desired rotational position.

An advantageous embodiment is characterized in that the blind hole comprises an undercut in the base region, the casting compound engaging in an interlocking manner in the undercut, and the casting compound and the electronic data carrier being fixed to one another in an interlocking manner.

As a result, the electronic data carrier is fixed to the shut-off member in a simple manner. Interlocking fixing is advantageous in particular when the material (for example PTFE) in the base region has low adhesive force.

An advantageous embodiment is characterized in that the blind hole comprises an internal thread that is arranged between an opening of the blind hole and the base region of the blind hole, in order to arrange a valve stem. During operation of the fluid valve, the valve stem is screwed into the internal thread and moves the central portion of the shut-off member, by means of a drive. At the same time, the electronic data carrier is protected from damage, in the blind hole, by means of the casting compound.

An advantageous embodiment is characterized in that the base region of the blind hole comprises a base surface that is normal to the longitudinal axis of the blind hole. This advantageously makes it easier to arrange and install the electronic data carrier. At the same time, this improves the readout of the electronic data carrier through the ventral portion.

An advantageous embodiment is characterized in that the electronic data carrier is discoid, a disc surface of the electronic data carrier being oriented in a plane approximately in parallel with the base surface. This makes it possible to arrange the electronic data carrier in a space-saving manner.

An advantageous embodiment is characterized in that the electronic data carrier rests on the base surface. This improves the wireless readout of the electronic data carrier through the ventral portion.

An advantageous embodiment is characterized in that a seat portion of the ventral portion is arranged radially outside the blind hole or outside an imaginary extension of the blind hole. Since the base of the blind hole is brought as close as possible to an outer surface of the ventral portion, arranging the seat portion radially on the outside ensures mechanical stability of the shut-off member.

An advantageous embodiment is characterized in that the material thickness of the shut-off member between the base region of the blind hole and a distal outer surface does not exceed a value of 3 mm, in particular a value of 2 mm. The material thickness ensures reliable readout of the electronic data carrier.

An advantageous embodiment is characterized in that an RFID chip (RFID=radio frequency identification) is provided as the electronic data carrier.

An advantageous embodiment is characterized in that the shut-off member is substantially rotationally symmetrical.

A second aspect relates to a method for producing a shut-off member for a fluid valve. The method comprises: making a blind hole in the shut-off member, the blind hole leading from a dorsal side into a ventral portion; arranging an electronic data carrier in a base region of the blind hole; and introducing a casting compound into the blind hole, the casting compound fixing the electronic data carrier to the shut-off member.

BRIEF DESCRIPTION OF THE DRAWINGS

Further features and advantages of the invention are also found in the following description of embodiments shown in the drawings. In the drawings.

DETAILED DESCRIPTION

Figure 1:
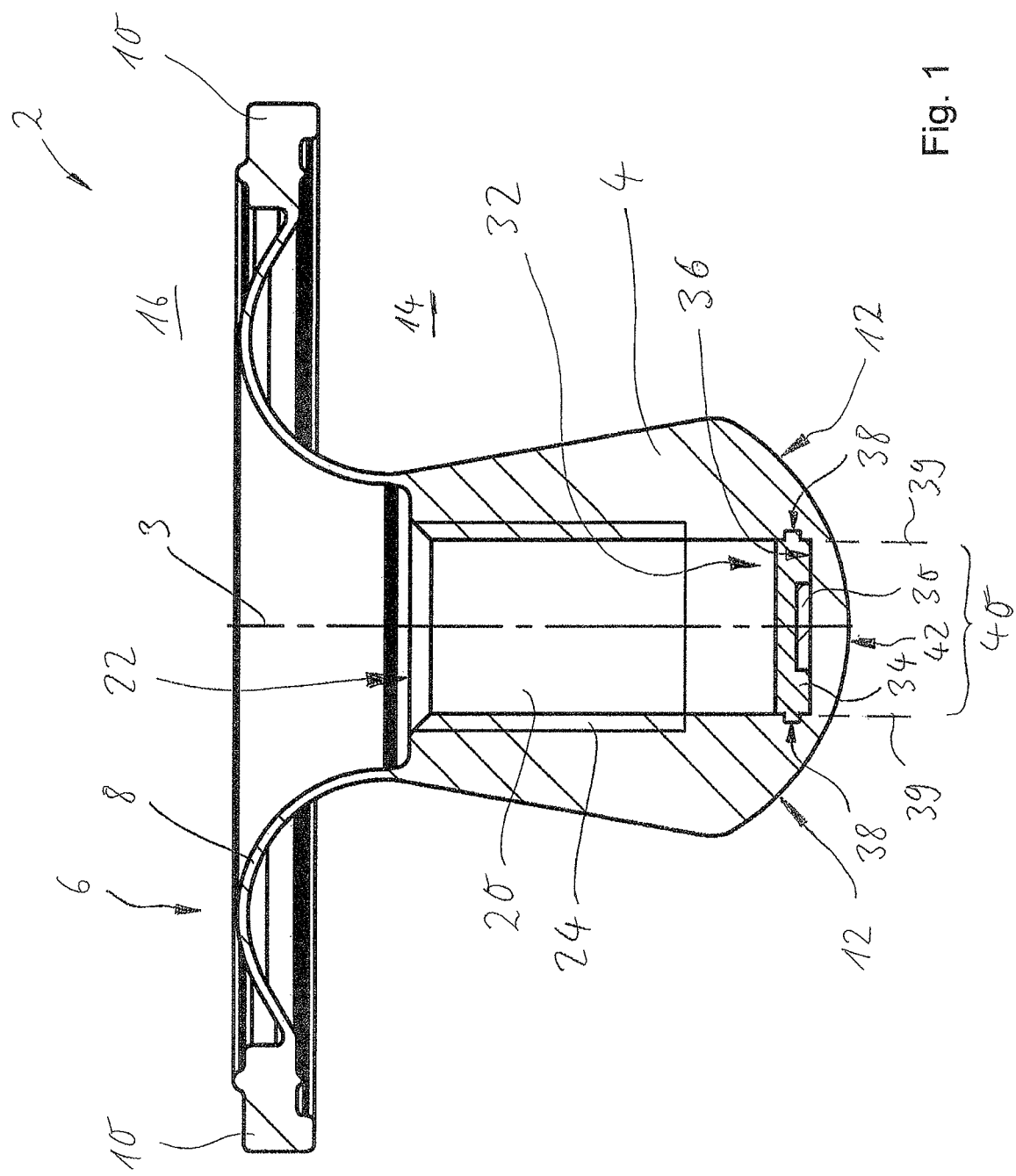
FIGS. 1 and 2 are schematic cross sections of a shut-off member.

FIG. 1 is a schematic cross section of a shut-off member 2. The shut-off member 2 is designed so as to be substantially rotationally symmetrical with respect to an axis of rotation 3. The shut-off member 2 can also be referred to as a plug diaphragm. The following description can of course also be transferred to differently designed shut-off members such as membranes or valve lifters. A ventral portion 4 of the shut-off member 2 is intended to be arranged in the direction of a fluid-conducting region 14 of a fluid valve. A dorsal portion 6 is intended to be arranged in the direction of a non-fluid-conducting region 16 of the fluid valve.

The dorsal portion 6 comprises a membrane portion 8 that transitions, radially outwardly, into a fastening portion 10. The fastening portion 10 is intended to be clamped for example between a valve body and an intermediate part of the fluid valve. Radially inwardly, the ventral portion 4 adjoins the membrane portion 8. In the distal direction, the ventral portion 4 increases in diameter and subsequently transitions into a dome region that comprises a seat region 12. The seat region 12 is used for installation on a valve seat.

Proceeding from the region 16, i.e. proceeding from the dorsal side of the shut-off member 2, a blind hole 20 extends along the axis of rotation 3 and into the ventral portion 4. Proceeding from an opening 22 of the blind hole 20, an internal thread 24 is milled into the wall of the blind hole. An external thread of a valve stem (not shown) of the fluid valve, which external thread corresponds to the internal thread 24, can be screwed into the internal thread 24. The valve stem, which is driven by a drive of the fluid valve, moves the ventral portion 4 axially in order to open and close a fluid channel. The membrane portion 8 allows for the above-mentioned movement and ensures separation of the regions 14 and 16.

An electronic data carrier 30 is arranged in a base region 32 of the blind hole 20 and is fixed to the shut-off member 2 by means of a casting compound 34 introduced into the blind hole. The electronic data carrier 30 is an RFID chip (RFID=radio frequency identification) and can also be referred to as a transponder. An identifier that is individual to the shut-off member 2 is stored on the electronic data carrier 30, which identifier is read out by means of a reader that is brought into the vicinity of the electronic data carrier 30. It is then possible, using said individual identifier, to monitor the shut-off member 2 even during production, and also in a facility belonging to the client/user.

The electronic data carrier 30 is for example discoid and may for example be rectangular or circular in plan view. A disc surface of the electronic data carrier 30 is arranged so as to be approximately in parallel with a base surface 36 of the blind hole 20. The base surface 36 is a plane that extends normally to the axis of rotation 3 of the blind hole 20. In the present example, the electronic data carrier 30 rests in a planar manner on the base surface 36 and is completely surrounded by the casting compound 34 in the dorsal direction. When hardened, the casting compound 34 engages in an undercut 38 of the blind hole 20, surrounds the electronic data carrier 30 at least in portions, and thus fixes the electronic data carrier 30 relative to the shut-off member 2 in an interlocking manner. This principle of the interlocking connection is advantageous in particular when the ventral portion 4 is made of polytetrafluoroethylene (PTFE), since polytetrafluoroethylene has a reduced surface tension.

The casting compound 34 comprises epoxy resin for example, which is metered into the blind hole 20 after the electronic data carrier 30 has been arranged. The casting compound 34 that is metered in is then hardened, for a hardening duration of at least 10 minutes, in particular at least 15 minutes, in a furnace at a hardening temperature of over 100° C., in particular over 130° C. In a further embodiment, the casting compound is furnace-hardened at 150° C. for one hour. The electronic data carrier 30 is thus fixed in the blind hole 20 by means of the casting compound 34. The casting compound 34 is preferably not electrically conductive and not magnetizable, and therefore wireless communication with the electronic data carrier 30 is not disrupted.

An imaginary extension 39 of the blind hole 20 that proceeds from the base surface 36 is located radially within a seat region 12. The structural isolation of the two regions prevents deformation or damage in a central region 40 of the shut-off member 2. The material thickness of the shut-off member 2 between the base surface 36 of the blind hole 20 and a distal outer surface 42 of the central region 40 is in a range of between 3 mm and 0.5 mm, in particular in a range of between 2 mm and 1 mm, as a result of which the readout of the electronic data carrier 30 through the central region 40 is improved.

Figure 2:
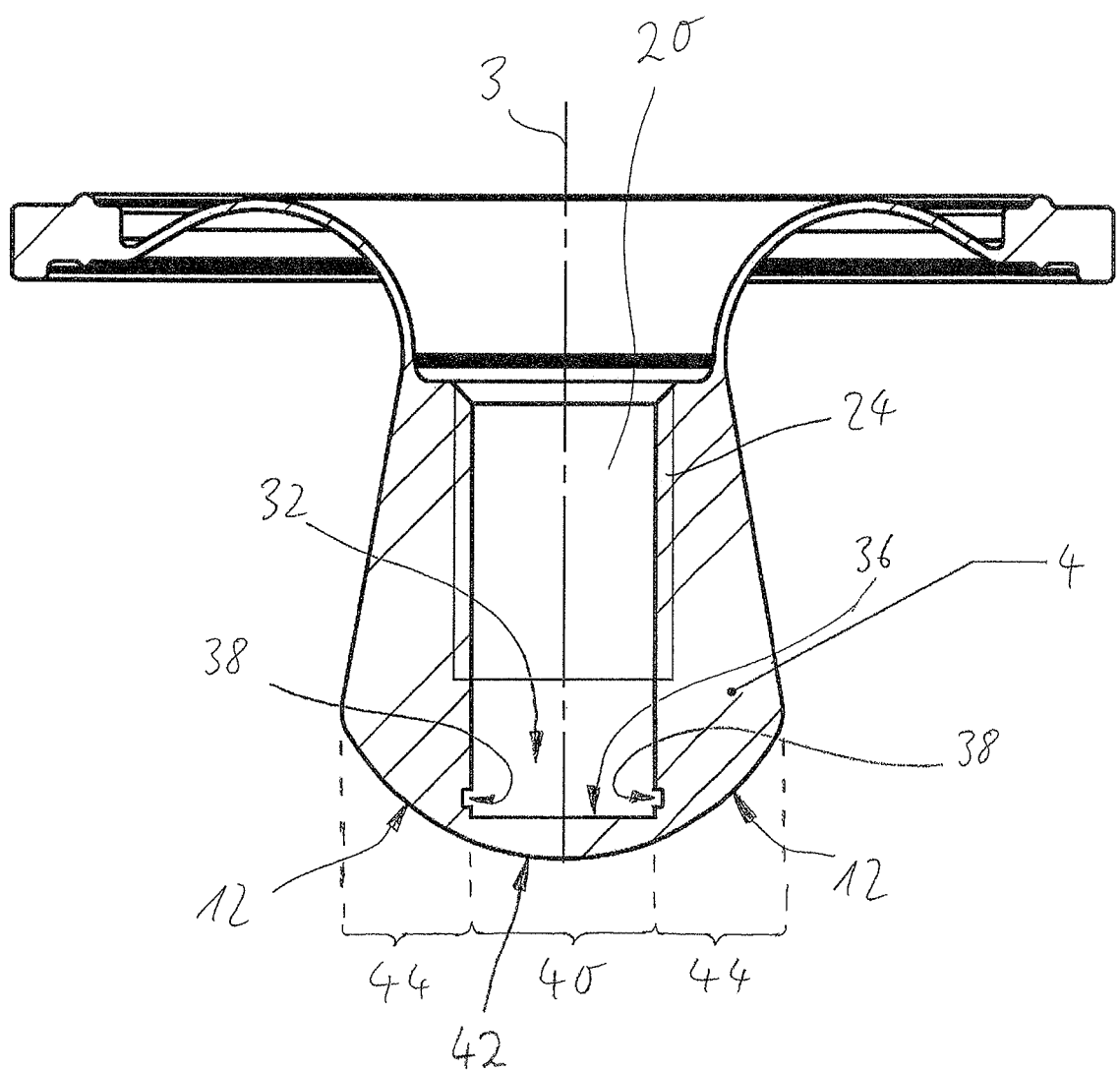

FIG. 2 is a schematic cross section through the shut-off member 2, the electronic data carrier 30 and the casting compound 34 not being shown. A lateral region 44 that surrounds the central region 40 adjoins radially outside the central region 40. The base region 32 comprises the base surface 36 and the undercut 38.

Figure 3:
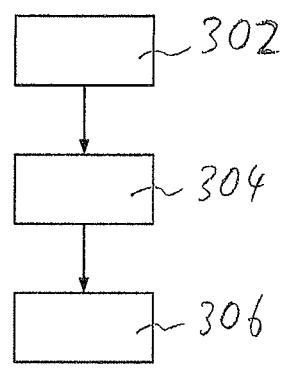
FIG. 3 is a schematic flow diagram.

FIG. 3 is a schematic flow diagram illustrating the production of the shut-off member 2 from FIG. 1. In a first step 302, the blind hole is made in the shut-off member. Step 302 comprises, for example, drilling the blind hole and subsequently producing the planar base surface 36. In a step 304, the electronic data carrier is arranged in the base region of the blind hole. For example, the electronic data carrier is preferably placed centrally on the base surface 36. In a step 306, the casting compound is introduced into the blind hole and in particular into the base region of the blind hole. The step 306 also comprises hardening the casting compound in the blind hole. In particular, the casting compound flows into the undercut, simultaneously surrounds the electronic data carrier, and, after hardening, fixes the electronic data carrier in the blind hole, and thus to the shut-off member, in an interlocking manner.

What is claimed is:

1. A Shut-off member for a fluid valve, the shut-off member comprising:
   a dorsal portion comprising a membrane portion;
   a ventral portion joined to the membrane portion, wherein the ventral portion is made of a first material, and wherein the ventral portion comprises an outer diameter increasing in a distal direction of the ventral portion;
   a blind hole extending from a dorsal side of the shut-off member at least into the outer diameter increase of the ventral portion,
   wherein the blind hole comprises an undercut in a bottom area;
   transponder that is arranged in the bottom area of the blind hole of the ventral portion, wherein an identifier of the shut-off member that is stored on a non-transitory electronic data carrier of the transponder is readable through a distal end of the ventral portion; and
   a casting compound that is introduced into the blind hole and that fixes the transponder arranged in the bottom area of the blind hole to the ventral portion of the shut-off member, wherein the casting compound is made of a second material different from the first material of the ventral portion, wherein the casting compound is in direct contact with an inner surface of the blind hole of the ventral portion, wherein the casting compound engages in an interlocking manner in the undercut, and wherein the casting compound and the transponder are fixed to one another in an interlocking manner.

2. The Shut-off member according to claim 1, wherein the blind hole comprises an internal thread that is arranged between an opening of the blind hole and the bottom area of the blind hole, in order to arrange a valve stem.

3. The Shut-off member according to claim 2, wherein the transponder is discoid, and wherein a disc surface of the transponder is oriented in a plane approximately in parallel with the base surface.

4. The Shut-off member according to claim 1, wherein the bottom area of the blind hole comprises a base surface that is perpendicular to the longitudinal axis of the blind hole.

5. The Shut-off member according to claim 4, wherein the transponder rests on the base surface.

6. The Shut-off member according to claim 1, wherein a seat portion of the ventral portion is arranged radially outside the blind hole or outside an imaginary extension of the blind hole.

7. The Shut-off member according to claim 1, wherein the material thickness of the shut-off member between the bottom area of the blind hole and a distal outer surface does not exceed a value of 3 mm.

8. The Shut-off member according to claim 1, wherein an RFID chip (RFID=radio frequency identification) is provided as the transponder.

9. The Shut-off member according to claim 1, wherein the shut-off member is substantially rotationally symmetrical.

* * * * *